United States Patent [19]

Iwai

[11] Patent Number: 5,081,386
[45] Date of Patent: Jan. 14, 1992

[54] MOTOR-OPERATED PUMP OF IN-TANK TYPE

[75] Inventor: Shingo Iwai, Hiroshima, Japan
[73] Assignee: Mitsubishi Denki K.K., Tokyo, Japan
[21] Appl. No.: 573,762
[22] Filed: Aug. 28, 1990

[30] Foreign Application Priority Data

Aug. 28, 1989 [JP] Japan .................. 1-99100[U]

[51] Int. Cl.⁵ .................. H01R 39/40; H02K 5/14
[52] U.S. Cl. .................. 310/87; 310/239
[58] Field of Search .................. 310/72, 87, 239, 247, 310/71, 248; 417/423.7

[56] References Cited

U.S. PATENT DOCUMENTS

| | | | |
|---|---|---|---|
| 3,836,291 | 9/1974 | Bottcher et al. | 417/423.7 |
| 3,870,910 | 3/1975 | Füssner | 310/66 |
| 4,118,647 | 10/1978 | Brenner et al. | |
| 4,354,128 | 10/1982 | Chew et al. | 310/247 |
| 4,673,837 | 6/1987 | Gingerich et al. | 310/68 R |
| 4,816,712 | 3/1989 | Tanaka . | |
| 4,896,067 | 1/1990 | Walther | 310/91 |
| 4,978,876 | 12/1990 | Koster | 310/89 |

FOREIGN PATENT DOCUMENTS

| | | |
|---|---|---|
| 170994 | 5/1906 | Fed. Rep. of Germany . |
| 1254231 | 11/1967 | Fed. Rep. of Germany . |
| 63-272994 | 11/1988 | Japan . |
| 305015 | 11/1929 | United Kingdom . |
| 2093531 | 4/1982 | United Kingdom . |

Primary Examiner—Steven L. Stephan
Assistant Examiner—D. L. Rebsch
Attorney, Agent, or Firm—Sughrue, Mion, Zinn Macpeak & Seas

[57] ABSTRACT

A motor-operated pump of the in-tank type has a driving motor with a commutator; a bracket covering one end of the motor adjacent to the commutator; a brush held against the commutator through a through hole formed in the bracket; an electrical noiseprevention element in a bottomed hole formed in the bracket, and electrically connected to the brush; and a terminal electrically connected to the electrical noiseprevention element. A brush spring-holder plate is fitted in the bracket for holding a brush spring urging the brush. An outer cover is fitted on the bracket for covering the bracket and the brush spring-holder plate.

4 Claims, 4 Drawing Sheets

MOTOR-OPERATED PUMP OF IN-TANK TYPE

BACKGROUND OF THE INVENTION

This invention relates to a motor-operated pump of the in-tank type adapted to be sunk in a liquid fuel tank of a vehicle such as an automobile.

FIGS. 5 to 7 show a conventional motor-operated pump of the in-tank type as disclosed in Japanese Laid-Open (Kokai) Patent Application No. 272994/88. In these Figures, a motor 1 serving as a pump drive source comprises a rotor 2, a commutator 3 of the rotor 2, and brushes 4 held in contact with the commutator 3 so as to supply electric power to the rotor 2. There are further provided an impeller 6 connected to a shaft 5 of the rotor 2 and forming the pump, an intake port 7 of the pump, a motor casing 8, a bracket 9 of the motor 1, an outer cover 10, a discharge port 10a of the pump, a terminal 11 mounted on the cover 10 so as to be supplied with electric power from the outside, brush springs 12 for urging the brushes 4 against the commutator 3, noise prevention elements 13 for preventing electrical noise, and the like. Internal terminals 13a are engaged with the terminal 11 supplied with electric power from the outside. Relay terminals 13b serve as a holder for the brush spring 12, and also serve as a relay terminal connected to a lead wire 4a extending from the brush 4.

In this arrangement, when electric power is supplied to the terminal 11, the electric power is transferred to the rotor 2 via the noise prevention elements 13, the brushes 4 and the commutator 3 for driving the rotor 2. As a result, the impeller 6 connected to the rotor 2 is rotated, so that fuel is drawn through the intake port 7 and is fed to an engine (not shown) or the like via the discharge port 10a.

In the foregoing motor-operated pump of the in-tank type, as described above, the power supply portion inserted into the bracket 9 for supplying electric power to the motor 2 is composed of many parts including the noise prevention elements 13, the brushes 4, the brush springs 12, and the like. This raises problems, in that the construction is complicated, and that since the springs and other parts are mounted at the same time, the assembling operation is difficult.

SUMMARY OF THE INVENTION

The present invention has been made in order to overcome the above problems, and an object of the invention is to provide a motor-operated pump of the in-tank type which is simple in construction, and enables a good assembling operation.

A motor-operated pump of the in-tank type according to the present invention comprises a brush spring-holder plate fitted in a bracket, and holding a brush spring urging a brush; and an outer cover covering the bracket and the brush spring-holder plate, and fitted on the bracket.

According to the invention, the noise prevention elements, the brushes and the like, can be mounted independently of the brush springs.

The brush springs can be positioned and held in place by projections on the brush spring-holder plate, and therefore the brush springs are held in a stable assembled condition.

DESCRIPTION OF THE PREFERRED EMBODIMENTS

Figure 1:
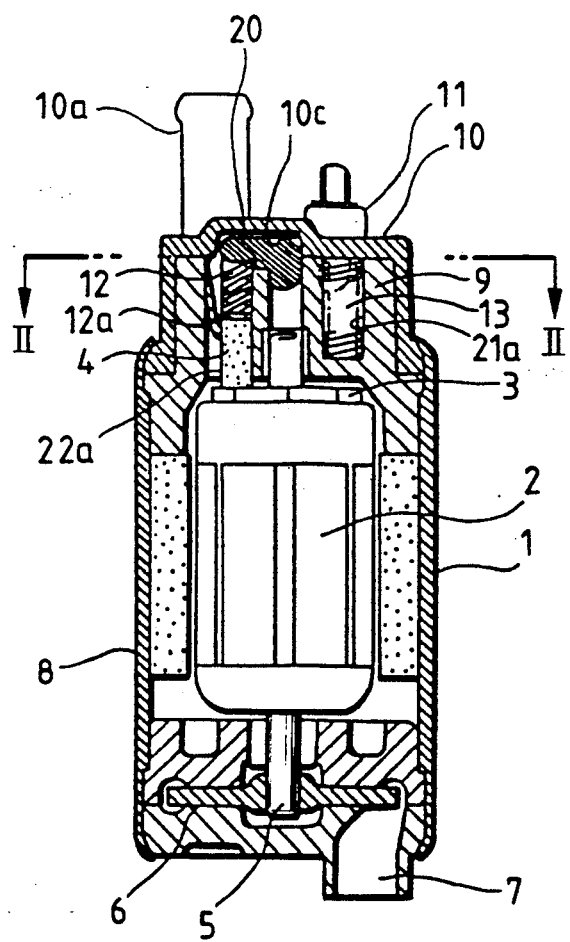
FIG. 1 is a vertical cross-sectional view of one example of the invention.
Figure 2:
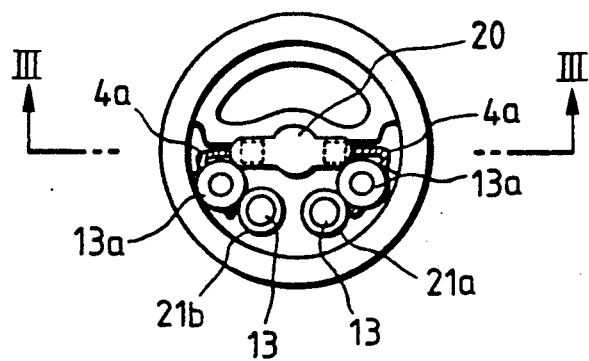
FIG. 2 is a cross-sectional view taken along the line II—II of FIG. 1.
Figure 3:
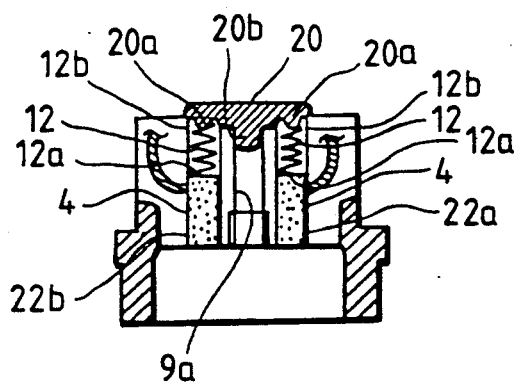
FIG. 3 is a cross-sectional view taken along the line III—III of FIG. 2.
Figure 4:
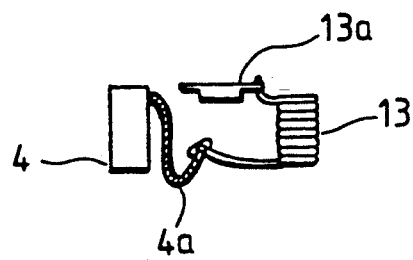
FIG. 4 is a developed view showing a connection of a power supply portion of the above example.

FIGS. 1 to 4 show one embodiment of the invention. In these Figures, a brush spring-holder plate 20 is fitted in a bracket 9. The bracket 9 has first and second bottomed blind holes 21a and 21b and first and second through holes 22a and 22b.

Noise prevention elements 13 are received in the first and second bottomed blind holes 21a and 21b, respectively, and brushes 4 are received in the first and second through holes 22a and 22b, respectively. In this assembled condition, first ends 12a of brush springs 12 are held against first ends of the brushes 4, respectively, whereas the other ends 12b of the brush springs 12 are engaged respectively with two first projections 20a on the brush spring-holder plate 20. A second projection 20b on the brush spring-holder plate 20 is fitted in a central hole 9a of the bracket 9, and the brush spring-holder 20 is fixed to the bracket 9, and holds the brush springs 12. An outer cover 10 is fitted on the bracket 9, and the brush spring-holder plate 20 is completely fixedly held between the bracket 9 and the inner surface 10c of the outer cover 10.

Figure 5:
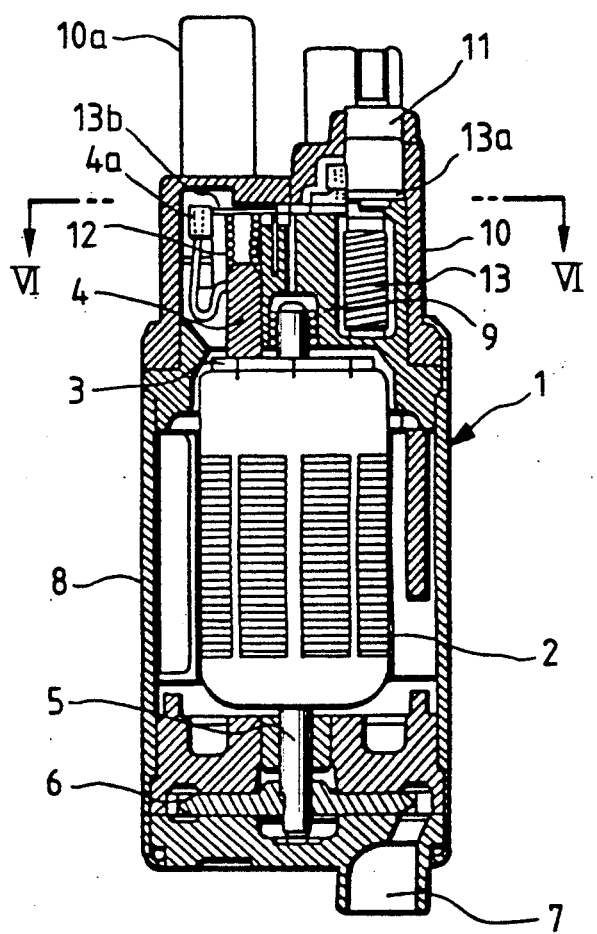
FIG. 5 is a vertical cross-sectional view of a conventional motor-operated pump of the in-tank type.
Figure 6:
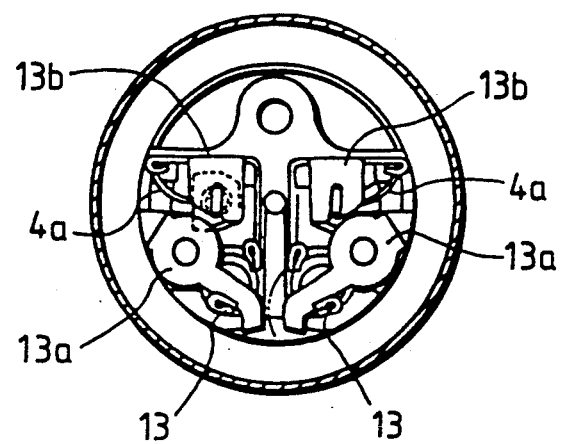
FIG. 6 is a cross-sectional view taken along the line VI—VI of FIG. 5.
Figure 7:
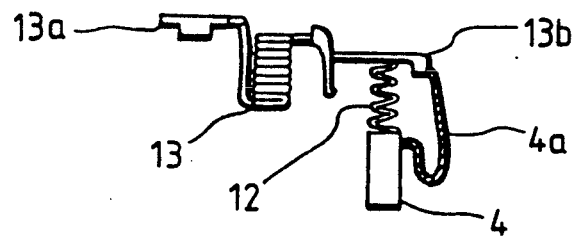
FIG. 7 is a developed view showing a connection of a power supply portion of the device of FIG. 5.

With respect to the remainder of the arrangement, the same reference numerals in these Figures and FIGS. 5 to 7 denote the same parts, respectively.

Since a fuel feed operation in the above arrangement is the same as that of the above-mentioned conventional device, explanation thereof is omitted.

In the embodiment, the noise prevention elements 13, the brushes 4 and the brush springs 12 can be mounted independently of each other.

The brush springs 12 are positioned and held in place by fitting the projections of the brush spring-holder plate 20 in the holes formed in the bracket 9.

As described above, in the present invention, the noise prevention elements, the brushes and the like, can be mounted independently of the brush springs, and therefore the assembling operation can be easier, and a stable assembled condition is achieved, thus improving the reliability.

I claim:

1. A motor-operated pump comprising:
   a driving motor, having a commutator;
   a bracket covering one end of said motor disposed adjacent to said commutator;
   a brush held against said commutator through a through hole formed in said bracket;
   an electrical noise-prevention element received in a bottomed hole formed in said bracket, said electrical noise-prevention element being electrically connected to said brush;

a terminal electrically connected to said electrical noise-prevention element;

a brush spring-holder plate fitted in said bracket, for holding a brush spring urging said brush; and an outer cover fitted on said bracket for covering said bracket and said brush spring-holder plate, said brush spring-holder plate being fixedly held between said bracket and an inner surface of said outer cover.

2. The pump of claim 1, wherein said brush spring is interposed between said spring-holder plate and said brush.

3. The pump of claim 2, wherein said spring-holder plate has at least one first projection engaged with said brush spring.

4. A motor-operated pump comprising:
a driving motor having a commutator;
a bracket covering one end of said motor disposed adjacent to said commutator;
a brush held against said commutator through a through hole formed in said bracket;
an electrical noise-prevention element received in a bottomed hole formed in said bracket, said electrical noise-prevention element being electrically connected to said brush;
a terminal electrically connected to said electrical noise-prevention element;
a brush spring-holder plate fitted in said bracket, for holding a brush spring urging said brush; and
an outer cover fitted on said bracket for covering said bracket and said brush spring-holder plate, wherein said brush spring is interposed between said spring-holder plate and said brush, and said spring-holder plate has at least one first projection engaged with said brush spring, and wherein said spring-holder plate has a second projection engaged in a hole formed in said bracket.

* * * * *